(12) United States Patent
Nespolo et al.

(10) Patent No.: US 9,479,907 B2
(45) Date of Patent: Oct. 25, 2016

(54) METHOD FOR OFF-LOADING DRIVER WIRELESS ACTIVITIES TO PASSENGERS VIA THE VEHICLE WIRELESS INTERFACE

(71) Applicant: DENSO International America, Inc., Southfield, MI (US)

(72) Inventors: Martin Nespolo, Rochester Hills, MI (US); Kyle Golsch, Pontiac, MI (US); Sibu Varughese, Sterling Heights, MI (US); Vikas Upmanue, Farmington Hills, MI (US); Yu Zhang, Troy, MI (US); Justin McBride, South Lyon, MI (US); Laith Daman, Novi, MI (US); Cary Horvath, Dearborn, MI (US); Thomas Krzyzak, Jr., Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/475,643

(22) Filed: Sep. 3, 2014

(65) Prior Publication Data
US 2015/0223032 A1 Aug. 6, 2015

Related U.S. Application Data

(60) Provisional application No. 61/936,625, filed on Feb. 6, 2014.

(51) Int. Cl.
*G05D 1/00* (2006.01)
*G05D 3/00* (2006.01)
(Continued)

(52) U.S. Cl.
CPC .............. *H04W 4/12* (2013.01); *G01C 21/362* (2013.01); *H04L 67/12* (2013.01); *H04L 67/125* (2013.01); *H04M 1/7253* (2013.01); *H04M 1/72552* (2013.01)

(58) Field of Classification Search
CPC .................... H04L 2012/40215; H04L 12/12; H04L 12/10; H04L 67/10; H04L 41/50; H04L 25/20; H04W 28/0289; H04W 4/005; H04W 72/02; H04W 8/205; H04W 4/18; H04W 88/02; H04W 72/085; H04W 24/08; H04W 40/02; H04W 24/02; H04W 88/04; H04W 4/04; H04W 28/18; H04W 52/18; G01C 21/3688; G01C 11/02; G01C 19/42; G01C 15/00; G01C 15/002; G01C 21/26
USPC ....... 701/1, 2, 36, 117, 119, 70, 101, 49, 51, 701/23, 22, 26, 28; 455/411, 418, 39, 563, 455/68, 78
See application file for complete search history.

(56) References Cited

U.S. PATENT DOCUMENTS 7,123,905 B1 * 10/2006 Allaway ............ H04B 7/18508
379/142.08
7,308,289 B2 * 12/2007 Sychta ................ H04M 1/6091
455/297
(Continued)

FOREIGN PATENT DOCUMENTS

WO WO-2005029244 A2 3/2005
WO 2013/012300 1/2013

OTHER PUBLICATIONS

International Search Report and Written Opinion dated May 21, 2015 in corresponding PCT Application No. PCT/US2015/014785 (13 pages).

*Primary Examiner* — Fadey Jabr
*Assistant Examiner* — Luis A Martinez Borrero
(74) *Attorney, Agent, or Firm* — Harness, Dickey & Pierce, P.L.C.

(57) ABSTRACT

A smart device interface for a vehicle. The smart device interface includes a transmitter/receiver and a controller. The transmitter/receiver is configured to communicate with a first smart device of a driver and a second smart device of a passenger. The controller is configured to permit the passenger to perform tasks on behalf of the driver using the second smart device. The tasks include responding to messages received by the first smart device of the driver, entertainment system operation, and navigation system operation.

17 Claims, 2 Drawing Sheets

(51) Int. Cl.
*G06F 7/00* (2006.01)
*G06F 17/00* (2006.01)
*H04W 4/12* (2009.01)
*G01C 21/36* (2006.01)
*H04L 29/08* (2006.01)
*H04M 1/725* (2006.01)

(56) References Cited

U.S. PATENT DOCUMENTS

| | | | | |
|---|---|---|---|---|
| 8,036,715 B2 * | 10/2011 | Buck | H04M 1/6083 381/302 |
| 8,254,993 B2 | 8/2012 | Bolton et al. | |
| 8,473,152 B2 * | 6/2013 | Zilka | H04M 1/6083 340/572.3 |
| 8,473,575 B2 | 6/2013 | Marchwicki et al. | |
| 8,559,981 B2 * | 10/2013 | Tieman | H04W 48/04 455/419 |
| 8,565,777 B2 * | 10/2013 | Ge | H04M 1/6091 455/450 |
| 8,571,476 B2 * | 10/2013 | Arndt | H04B 5/0012 180/287 |
| 8,707,044 B2 * | 4/2014 | Shim | H04M 1/6091 379/201.05 |
| 8,725,217 B2 * | 5/2014 | Kitahara | H04M 1/6091 455/41.1 |
| 8,781,457 B2 * | 7/2014 | Randazzo | H04W 48/04 455/418 |
| 8,892,593 B2 * | 11/2014 | Furuta | H04W 4/046 707/769 |
| 9,020,566 B2 * | 4/2015 | Takikawa | H04W 4/001 455/566 |
| 2002/0177928 A1 * | 11/2002 | Moriguchi | H04M 1/6091 701/1 |
| 2003/0032460 A1 * | 2/2003 | Cannon | H04M 1/6091 455/569.2 |
| 2005/0026608 A1 * | 2/2005 | Kallio | H04B 7/18563 455/431 |
| 2006/0240781 A1 * | 10/2006 | Tabe | H04M 1/6083 455/66.1 |
| 2009/0181613 A1 * | 7/2009 | Chen | G08C 17/00 455/3.06 |
| 2010/0041397 A1 * | 2/2010 | Chutorash | H04W 48/18 455/432.1 |
| 2010/0097239 A1 * | 4/2010 | Campbell | B60R 11/0252 340/4.4 |
| 2010/0216401 A1 * | 8/2010 | Kitahara | H04M 1/6091 455/41.2 |
| 2011/0210830 A1 | 9/2011 | Talty et al. | |
| 2011/0217929 A1 * | 9/2011 | Anderson | H04M 1/6091 455/41.2 |
| 2011/0258221 A1 * | 10/2011 | Furuta | H04W 4/046 707/769 |
| 2011/0300843 A1 * | 12/2011 | Miller | H04M 1/6075 455/418 |
| 2012/0094606 A1 * | 4/2012 | Sakata | G08G 1/092 455/66.1 |
| 2012/0214471 A1 | 8/2012 | Tadayon et al. | |
| 2013/0045725 A1 * | 2/2013 | Park | B60R 25/00 455/414.1 |
| 2013/0099892 A1 | 4/2013 | Tucker et al. | |
| 2013/0157647 A1 | 6/2013 | Kolodziej | |
| 2014/0155110 A1 | 6/2014 | Park et al. | |
| 2014/0195102 A1 * | 7/2014 | Nathanson | G07C 5/0808 701/31.4 |
| 2014/0207313 A1 * | 7/2014 | Nishidai | B60R 25/00 701/2 |
| 2015/0065051 A1 * | 3/2015 | Miyazawa | H04W 4/008 455/41.2 |
| 2015/0210287 A1 * | 7/2015 | Penilla | B60W 40/08 701/49 |
| 2015/0232045 A1 * | 8/2015 | Colella | B60R 16/023 701/49 |

\* cited by examiner

METHOD FOR OFF-LOADING DRIVER WIRELESS ACTIVITIES TO PASSENGERS VIA THE VEHICLE WIRELESS INTERFACE

CROSS-REFERENCE TO RELATED APPLICATION

This application claims the benefit and priority of U.S. provisional patent application U.S. 61/936,625 filed Feb. 6, 2014, the entire disclosure of which is incorporated herein by reference.

FIELD

The present disclosure relates to methods, systems, and devices for off-loading driver wireless activities to passengers by way of a vehicle interface.

BACKGROUND

This section provides background information related to the present disclosure, which is not necessarily prior art.

It is well known that automobile accidents affect teenage drivers more than any other population segment. Young drivers also report the highest level of phone use during accidents and near accidents. Text messaging and responding to text messages, setting up and scanning music play lists, and talking to other passengers often have a greater importance for teenage drivers than safety concerns. Applications that minimize driver attention to these activities will likely increase driver safety, such as by allowing drivers to better focus on the primary task of driving, and increase the safety of the entire driving population. The present teachings take these factors and issues into account to increase driver safety by integrating smart devices (phones, tablets, etc.) and vehicle wireless technology to off-load various tasks (such as text messaging, music manipulation, navigation entry, etc.) from the driver to passengers in the vehicle.

SUMMARY

The present teachings provide for a smart device interface for a vehicle. The smart device interface includes a transmitter/receiver and a controller. The transmitter/receiver is configured to communicate with a first smart device of a driver and a second smart device of a passenger. The controller is configured to permit the passenger to perform tasks on behalf of the driver using the second smart device. The tasks include responding to messages received by the first smart device of the driver, entertainment system operation, and navigation system operation.

The present teachings further provide for a vehicle smart device interface including a vehicle display and a controller. The vehicle display is configured to notify a driver that a first mobile smart device of the driver has received a message. The controller is configured to transfer the message from the first mobile smart device of the driver to a second mobile smart device of a passenger for the passenger to respond to the message on behalf of the driver.

The present teachings also provide for a method for transferring operation of tasks to a passenger of a vehicle. The method includes pairing a first mobile smart device of a driver with a smart device interface of the vehicle; pairing a second mobile smart device of a passenger with the smart device interface of the vehicle; and transferring control of tasks from a driver to a passenger for the passenger to control using the second mobile smart device. Tasks that may be transferred include responding to messages received by the first mobile smart device of the driver, entertainment system operation, and navigation system operation.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
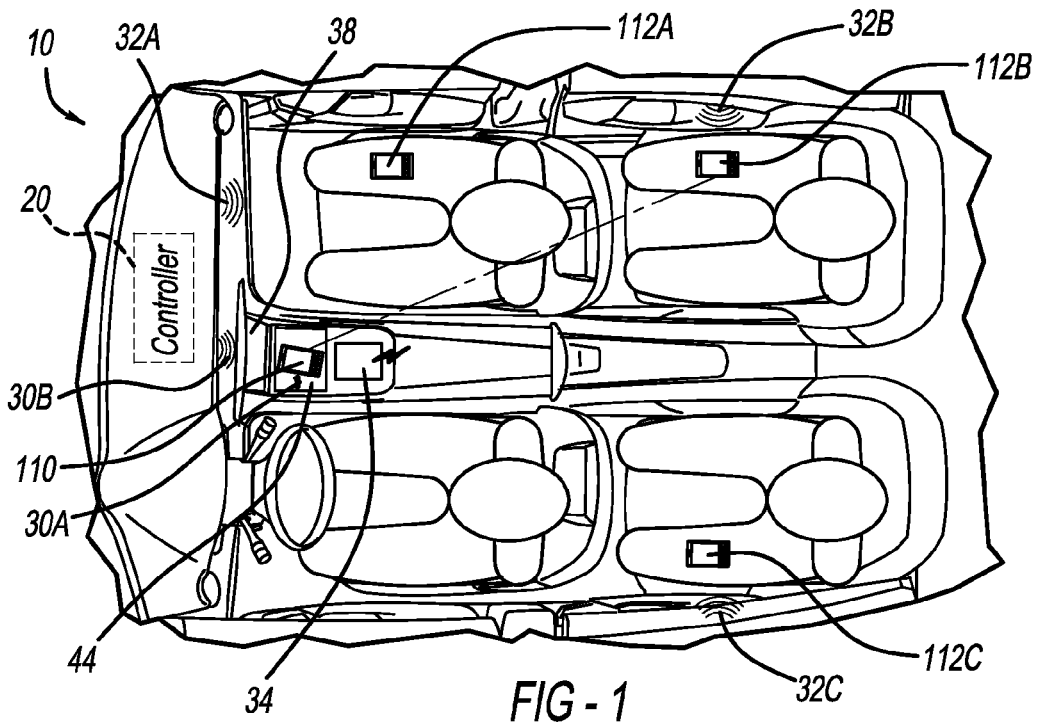
FIG. 1 is a plan view of a passenger cabin including a vehicle smart phone interface according to the present teachings.
Figure 2:
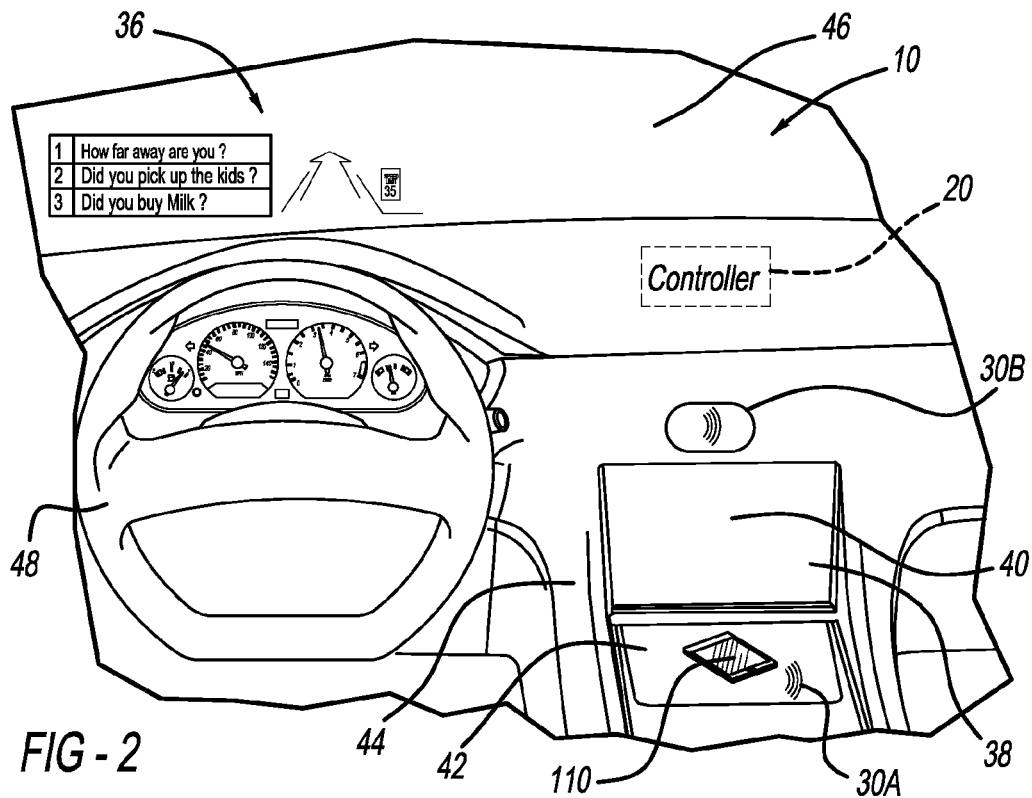
FIG. 2 illustrates the passenger cabin of FIG. 1 from a driver's viewpoint.

With initial reference to FIGS. 1 and 2, a passenger cabin according to the present teachings is generally illustrated at reference numeral 10. The passenger cabin 10 can be a passenger cabin of any suitable vehicle, such as a car, truck, bus, military vehicle, train, watercraft, or aircraft, for example. The passenger cabin 10 has a vehicle smart device interface, which includes a controller 20, a plurality of readers 30A, 30B, 32A, 32B, and 32C, a transmitter/receiver 34, a heads-up display 36 (FIG. 2), and an entertainment/navigation system 38 including a display 40.

The controller 20 can be any suitable controller configured to pair smart devices 110, 112A, 112B, and 112C with the vehicle smart device interface, control communication between the smart devices 110 and 112A-112C, process inputs from a driver of the vehicle, and control the entertainment/navigation system 38, for example. The controller 20 can be or include any suitable processor, for example, and can be positioned at any suitable position in the vehicle. The smart device 110 can be a driver's smart device, and the smart devices 112A, 112B, and 112C can be passenger smart devices. The smart devices 110 and 112 can include any suitable smart devices, such as smart phones, tablet computers, and any other portable computer, such as a laptop computer. Thus, the vehicle smart device interface can be a vehicle smart phone interface.

The readers 30A, 30B, and 32A-32C can be any suitable wireless or wired readers or connectors configured to read a device identification code from smart devices 110 and 112A-112C in order to pair the smart devices 110 and 112A-112C with the vehicle smart device interface (particularly with the controller 20). For example, the readers 30A, 30B and 32A-32C can be near-field communication readers, such as RFID readers. The readers 30A, 30B, and 32A-32C can be located at any suitable positions throughout the passenger cabin 10. For example, the reader 30A can be at or proximate to a ceremonial or storage location 42 at a center counsel 44 of the passenger cabin 10. The reader 30A can be configured to read a device identification code from smart device 110, which can be the driver's smart device, in order to pair the smart device 110 with the vehicle smart phone interface, and particularly with the controller 20. The readers 32A, 32B, and 32C can be located at any suitable positions proximate to passenger seats of the passenger cabin 10. For example, the reader 32A can be located at a front passenger seat, and the readers 32B and 32C can each be located at different rear seats, as illustrated in FIG. 1. The readers 30A, 30B, and 32A-32C can be arranged below an outer surface of vehicle upholstery, for example. A slight bump or raised portion of the upholstery can indicate the location of readers 30A, 30B, and 32A-32C, and/or the readers 30A, 30B and 32A-32C can be visually marked in any suitable manner. The reader 32A can also be located at the storage location 42, and thus both the driver smart device 110 and the passenger smart device 112A can be stored at the storage location 42. The storage location 42 can include a divider to divide the storage location into a driver side and a passenger side.

The transmitter/receiver 34 can be any suitable transmitter/receiver 34 for communicating with the smart devices 110 and 112A-112C when they are present in the passenger cabin 10, and paired with the vehicle smart phone interface. For example, the transmitter/receiver 34 can receive information from, and transmit information to, the smart devices 110 and 112A-112C. The transmitter/receiver 34 can be arranged at any suitable location in the passenger cabin 10, such as at the center counsel 44. The transmitter/receiver 34 can communicate with the smart devices 110 and 112A-112C in any suitable manner, such as with a Bluetooth connection.

The heads-up display 36 illustrated in FIG. 1 can be any suitable device for projecting information in the driver's line of sight, such as on, or proximate to, a windshield 46. For example, the heads-up display 36 can project messages received by the driver's smart device 110, or any other suitable information.

The entertainment/navigation system 38 can be any suitable entertainment and/or navigation system configured to receive inputs, such as music or navigational information, from smart devices paired with the vehicle smart phone interface, such as the smart devices 112A-112C. The entertainment/navigation system 38 can include, for example, an audio player configured to store and play music through speakers positioned within the passenger cabin 10. The drivers and passengers may interact with the entertainment/navigation system 38 through display 40, which may be a touch display configured to receive touch command inputs. The display 40 may also accept commands for operating the driver's smart device 110 when paired with the vehicle smart phone interface.

A driver can pair his or her smart device 110 by placing the smart device 110 at the storage location 42, where a device ID of the smart device 110 can be read by the reader 30A, such as by RFID. The controller 20 can then pair the smart device 110 with the controller 20 of the vehicle smart phone interface. The controller 20 can communicate with the paired driver smart device 110 by way of the transmitter/receiver 34, for example. With the smart device 110 paired with the controller 20, the driver can interact with, and operate, the smart device 110 using the heads-up display 36, voice commands, and/or controls located throughout the passenger cabin, such as at the display 40 or on steering wheel 48. The driver need not store his/her smart device 110 at the storage location 42, and can thus alternatively bring the smart device 110 in contact with, or in close proximity to, the reader 30B in order to initiate the pairing sequence.

After the driver's smart device 110 has been paired with the vehicle smart phone interface, inputs to the driver's smart device 110, such as incoming text messages for example, can be transmitted from the smart device 110 for receipt by the transmitter/receiver 34 of the passenger cabin, such as by Bluetooth connection, for example. The text messages can be directed to the heads-up display 36 by the controller 20 for viewing by the driver, as illustrated in FIG. 2. Any other information accessible through the smart device 110 can also be made accessible to the driver by way of the heads-up display 36, such as incoming call information, e-mail messages, navigation information, music information (such as song information and music playlists), etc.

As the driver receives text messages or instant messages, for example, a message icon can appear in the driver's heads-up display 36. The message icon may include a summary of the message (such as the first few words) or the entire message. The driver can then review the messages and determine whether to respond. If privacy concerns are not an issue, the driver can use controls, such as controls located in the steering wheel 48, to pass the message to a passenger for responding.

Passengers can gain access to the vehicle's smart phone interface by tapping their passenger smart devices 112A, 112B, and/or 112C on the passenger readers 32A, 32B, or 32C. The readers 32A-32C will read device ID's from the passenger smart devices 112A-112C in order to pair one or more of the devices 112A-112C with the controller 20 of the vehicle smart phone interface, such as by way of the transmitter/receiver 34. After the passenger smart devices 112A, 112B, and/or 112C have been paired with the vehicle interface, they can receive select incoming messages passed through the vehicle interface from the driver's smart phone 110. The driver can individually select any one or more of the passenger smart devices 112A, 112B, and/or 112C for receipt of the messages.

Figure 3:
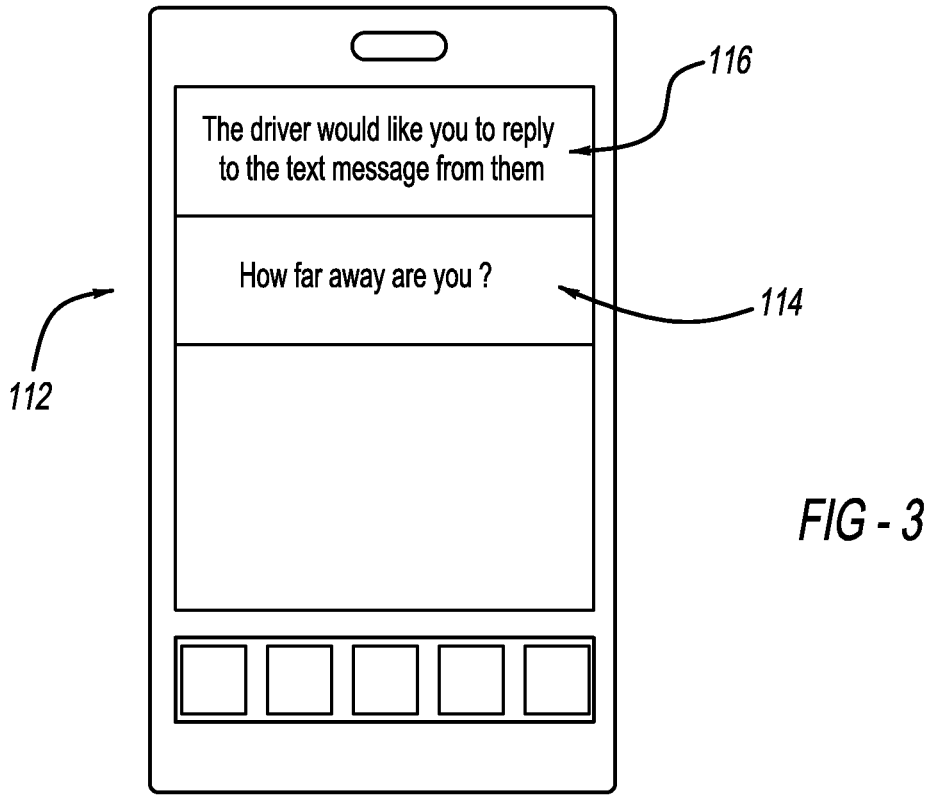
FIG. 3 illustrates a passenger smart device in receipt of a text message originally sent to a driver's smart device, along with a message from the driver to the passenger for handling the text message.

For example, if the driver is preoccupied with operating the vehicle, he/she can input a command to the controller 20 to transfer a received text message to any one or more of the passenger smart devices 112A-112C present in the passenger cabin 10 that the driver selects. In other words, the driver can select which passengers receive a particular transferred message, and which drivers don't receive the particular transferred message, thereby excluding one or more passengers from receiving the particular message. The driver can command the controller 20 to transfer the text message using voice commands, or can enter the command using controls on the touch display 40 or the steering wheel 48, for example. FIG. 3, illustrates an exemplary passenger smart device 112 including a text message relayed from the driver at 114. The driver can attach or prepend a message 116 to one or more passengers requesting that they respond to the text message 114. Using his or her passenger smart device 112A-112C, the passenger can respond to and send text messages, which are passed through the vehicle's smart device interface and transmitted to the sender as if the messages were sent from the driver's smart device 110.

Passengers can also create music playlists from their own smart device 112A-112C, and share the playlists with the vehicle's entertainment/navigation system 38. Once shared, the title, artist, and other information of the music can be viewed on the display 40, for example. The music and/or playlist can reside in, for example, the vehicle's entertainment/navigation system 38, on the passenger smart devices 112A-112C, and/or stored at a remote location (such as in the Internet "cloud"). Internet radio can also be input to the entertainment/navigation system 38 from the passenger smart devices 112A-112C.

Figure 4:
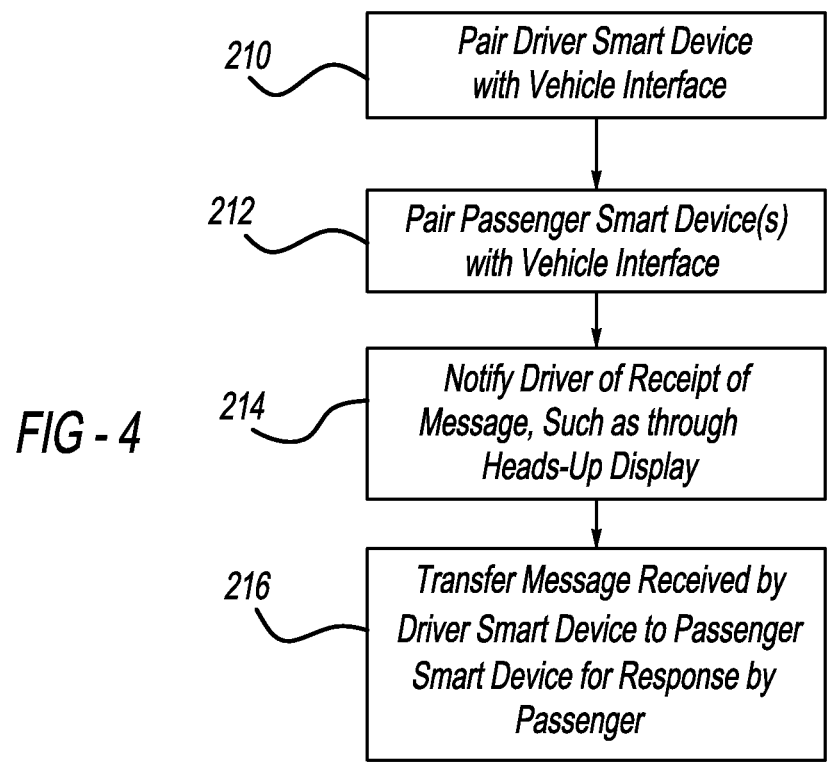
FIG. 4 illustrates a method for off-loading driver activities to a passenger according to the present teachings.

With additional reference to FIG. 4, an exemplary method according to the present teachings will now be described. With initial reference to block 210, the driver pairs his/her smart device 110 with the vehicle smart device interface in any suitable manner, such as by bringing his/her smart device 110 in contact with, or in close proximity to, either the reader 30A at the storage location 42 or the reader 30B at the center counsel 44. The controller 20 will then make the functionality of the driver's smart device 110 available through the vehicle interface, such as through the head-up display 36 or the display 40, for example. The paired driver smart device 10 can communicate with the vehicle interface in any suitable manner, such as with a wireless connection (Bluetooth for example) between the driver smart device 110 and the transmitter/receiver 34.

With reference to block 212, passengers of the passenger cabin 10 can pair one or more of their passenger smart devices 112A, 112B, 112C with the vehicle interface in any suitable manner, such as by bringing the smart devices 112A-112C in contact with, or in close proximity to, the readers 32A-32C for reading the device ID's from the smart devices 112A-112C. The paired passenger smart devices 112A, 112B, and 112C can communicate with the vehicle interface in any suitable manner, such as with a wireless connection between the passenger smart device 112A-112C and the transmitter/receiver 34.

With reference to block 214, upon receipt of a text message, for example, by the driver's smart device 110, the controller 20 transmits notification of the text message to the driver through the vehicle interface in any suitable manner, such as by way of the heads-up display 36. The heads-up display 36 may be used to provide the driver with other notifications as well, such as receipt of an incoming call, receipt of an e-mail message, etc. The driver can then decide if he/she would like to transfer the message to a passenger for the passenger to respond. The driver can transfer the message to any one or more passengers selected by the driver. The driver can thus exclude particular passengers and prevent them from seeing the message, or at least prevent them from having the ability to reply to the message. If the driver decides that he/she would like a passenger to respond, then at block 216 the driver inputs a transfer command to the controller 20 in any suitable manner, such as by voice command or entry at the touch display 40 or controls of steering wheel 48. The controller 20 then transmits the message 114 (FIG. 3) to one or more of the passenger smart devices 112A-112C for response, such as by using the transmitter/receiver 34. The driver may add a personal message 116 (FIG. 3) to the passenger, such as with a voice command. The passenger can then respond on behalf of the driver using his/or her passenger smart device 112, which will allow the driver to concentrate on operating the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A smart device interface for a vehicle comprising:
   a transmitter/receiver configured to communicate with a first smart device of a driver and a second smart device of a passenger; and
   a controller including non-transitory, computer-readable storage medium and configured to:
   permit the passenger to perform tasks on behalf of the driver using the second smart device, including responding to messages received by the first smart device of the driver, entertainment system operation, and navigation system operation;
   notify the driver that the first smart device of the driver has received a message;
   inquire of the driver whether the driver would like to respond to the message received by the first smart device or transfer the message to the second smart device of the passenger;
   accept an input from the driver requesting that the message be transferred to the passenger for response, and transmit an instruction to respond to the message to the second smart device of the passenger, when the driver delegates responding to the message to the passenger; and
   accept a response to the message directly from the driver using the first smart device, when the driver does not delegate responding to the message to the passenger.

2. The smart device interface of claim 1, further comprising:
   a first reader configured to read a first identification code of the first smart device to pair the first smart device with the controller; and
   a second reader configured to read a second identification code of the second smart device to pair the second smart device with the controller.

3. The smart device interface of claim 1, wherein:
   the passenger is a first passenger, and the transmitter/receiver is configured to communicate with a third smart device of a second passenger;
   the controller is configured to notify the driver that the first smart device of the driver has received a message;
   the controller is configured to accept an input from the driver requesting that the message be transferred to at least one of the first passenger or the second passenger for response; and
   the controller is configured to transmit an instruction to respond to the message to the at least one of the first passenger or the second passenger selected, thereby excluding any passenger not selected.

4. The smart device interface of claim 1, wherein the controller is configured to notify the driver by way of a heads-up display that the first smart device of the driver has received a message.

5. The smart device interface of claim 1, further comprising an RFID reader at each passenger seat of the vehicle configured to read an identification code of the second smart device to pair the second smart device with the controller.

6. The smart device interface of claim 1, wherein the first smart device and the second smart device are each smart phones.

7. The smart device interface of claim 1, wherein the controller is configured to control an entertainment system of the passenger cabin to play music from the second smart device.

8. The smart device interface of claim 1, wherein the controller is configured to control a display of the passenger cabin to display navigation information in response to commands from the second smart device.

9. A vehicle smart device interface comprising:
   a vehicle display configured to notify a driver that a first mobile smart device of the driver has received a message; and
   a controller including non-transitory, computer-readable storage medium and configured to:
   transfer the message from the first mobile smart device of the driver to a second mobile smart device of a passenger for the passenger to respond to the message on behalf of the driver;
   notify the driver that the first mobile smart device of the driver has received a message;
   inquire of the driver whether the driver would like to respond to the message received by the first mobile smart device or transfer the message to the second mobile smart device of the passenger;
   accept an input from the driver requesting that the message be transferred to the passenger for response, and transmit an instruction to respond to the message to the second mobile smart device of the passenger, when the driver delegates responding to the message to the passenger; and
   accept a response to the message directly from the driver using the first mobile smart device, when the driver does not delegate responding to the message to the passenger.

10. The vehicle smart device interface of claim 9, wherein the vehicle display is a heads-up display of the driver.

11. The vehicle smart device interface of claim 9, further comprising a vehicle transmitter/receiver configured to transmit data to, and receive data from, both the first mobile smart device and the second mobile smart device.

12. The vehicle smart device interface of claim 9, further comprising a plurality of readers mounted throughout a passenger cabin of the vehicle configured to read device identification information from the first mobile smart device and the second mobile smart device to pair the first and the second mobile smart devices with the controller.

13. A method for transferring operation of tasks to a passenger of a vehicle comprising:
   pairing a first mobile smart device of a driver with a smart device interface of the vehicle, the pairing of the first mobile device performed by a controller including non-transitory, computer-readable storage medium configured to perform the pairing of the first mobile smart device;
   pairing a second mobile smart device of a passenger with the smart device interface of the vehicle, the pairing of the second mobile smart device performed by the controller configured to perform the pairing of the second mobile smart device;
   notifying the driver that the first smart device of the driver has received a message, the notifying performed by the controller configured to perform the notifying;
   inquiring of the driver whether the driver would like to respond to the message received by the first smart device or transfer the message to the second smart device of the passenger, the inquiring performed by the controller configured to perform the inquiring;

accepting an input from the driver requesting that the message be transferred to the passenger for response, the accepting performed by the controller configured to perform the accepting;

transmitting with a transmitter/receiver an instruction to respond to the message to the second smart device of the passenger, and transferring control of tasks from the driver to the passenger for the passenger to control using the second mobile smart device, the transfer performed by the controller when the driver delegates control of the tasks to the passenger, the transferred tasks including entertainment system operation and navigation system operation; and accepting control inputs directly from the driver using the first mobile device for control of the tasks when the driver does not delegate control of the tasks to the passenger, the control inputs accepted by the controller.

14. The method of claim 13, further comprising:

pairing the first mobile smart device using a first RFID reader mounted in a passenger cabin of the vehicle; and
pairing the second mobile smart device using a second RFID reader mounted in the passenger cabin;

wherein the pairing of the first mobile smart device and the pairing of the second mobile smart device is performed by the controller.

15. The method of claim 13, wherein the passenger is a first passenger, and further comprising: pairing a third mobile smart device of a second passenger with the smart device interface of the vehicle, the pairing of the third mobile smart device performed by the controller configured to perform the pairing of the third mobile smart device; and transferring the task of responding to messages received by the first mobile smart device of the driver to at least one of the second mobile smart device or the third mobile smart device by the controller configured to perform the transferring.

16. The method of claim 13, further comprising transmitting a music playlist from the second mobile smart device to an entertainment system of the vehicle with the transmitter/receiver.

17. The method of claim 13, further comprising transmitting navigation information from the second mobile smart device to a navigation system of the vehicle with the transmitter/receiver, and displaying the navigation system information on a display of the vehicle.

* * * * *